United States Patent
Marttila et al.

(10) Patent No.: US 7,830,368 B2
(45) Date of Patent: Nov. 9, 2010

(54) KEYPAD WITH VIRTUAL IMAGE

(75) Inventors: Charles A. Marttila, Shoreview, MN (US); John T. Strand, Stillwater, MN (US); Alan G. Hulme-Lowe, Woodbury, MN (US); M. Benton Free, St. Paul, MN (US); John S. Huizinga, White Bear Lake, MN (US); James N. Dobbs, Woodbury, MN (US); Serge Wetzels, Maplewood, MN (US); Glen A. Jerry, Roseville, MN (US); Jennifer R. Yi, Woodbury, MN (US); William R. Dudley, Geneseo, NY (US)

(73) Assignee: 3M Innovative Properties Company, St. Paul, MN (US)

( * ) Notice: Subject to any disclaimer, the term of this patent is extended or adjusted under 35 U.S.C. 154(b) by 698 days.

(21) Appl. No.: 11/755,819

(22) Filed: May 31, 2007

(65) Prior Publication Data
US 2007/0279391 A1 Dec. 6, 2007

Related U.S. Application Data

(60) Provisional application No. 60/804,009, filed on Jun. 6, 2006.

(51) Int. Cl.
*G06F 3/42* (2006.01)
(52) U.S. Cl. ........................ 345/175; 345/176
(58) Field of Classification Search ......... 345/156–176, 345/607; 348/E13.028; 355/28, 30, 50, 55, 355/79, 83; 359/626, 456, 460; 235/462.11, 235/462.1, 462.42
See application file for complete search history.

(56) References Cited

U.S. PATENT DOCUMENTS

| | | | | | |
|---|---|---|---|---|---|
| 2,645,411 | A | * | 7/1953 | Andler | 415/148 |
| 4,307,047 | A | * | 12/1981 | Edinger et al. | 264/478 |
| 4,668,095 | A | * | 5/1987 | Maeda | 356/400 |
| 5,054,778 | A | * | 10/1991 | Maleyko | 473/570 |

(Continued)

FOREIGN PATENT DOCUMENTS

WO  WO 99/50737  10/1999

OTHER PUBLICATIONS

Hutley, M.C., et al, "The Moiré magnifier," *Pure Appl. Opt.*, vol. 3, (1994), pp. 133-142.

(Continued)

*Primary Examiner*—Prabodh M Dharia
(74) *Attorney, Agent, or Firm*—Daniel R. Pastirik (57) ABSTRACT

A keypad having a virtual floating image that appears to a user to be in a plane other than the apparent plane of the keypad surface. More particularly, the indicia on the keypad appear to float above or below the surface of the device. The keypad can be, for example, the keypad on a cell phone. For such an application there would be more than one array of indicia present on the keypad. For example, there might be ten arrays of indicia, which provide the numerals from 0 to 9 and two more arrays to provide virtual images of the * and # keys. In some embodiments, the keypad is integrated with an illumination source that light up the indicia. The present disclosure also provides a method of manufacturing a key pad with a virtual floating image.

28 Claims, 7 Drawing Sheets

U.S. PATENT DOCUMENTS

| | | | |
|---|---|---|---|
| 6,037,882 A * | 3/2000 | Levy | 341/20 |
| 6,351,268 B1 * | 2/2002 | Genoe | 345/607 |
| 6,614,422 B1 | 9/2003 | Rafii et al. | |
| 6,650,318 B1 | 11/2003 | Arnon | |
| 7,034,806 B2 | 4/2006 | Nakagawa | |
| 7,305,631 B1 * | 12/2007 | Bort | 715/864 |
| 7,562,985 B2 * | 7/2009 | Cortenraad et al. | 353/28 |
| 2002/0003667 A1 * | 1/2002 | Curley et al. | 359/630 |
| 2002/0070921 A1 | 6/2002 | Feldman | |
| 2003/0222199 A1 * | 12/2003 | Corson | 250/208.1 |
| 2004/0233173 A1 * | 11/2004 | Bryant | 345/169 |
| 2005/0051931 A1 | 3/2005 | Humlicek et al. | |
| 2005/0141843 A1 * | 6/2005 | Warden et al. | 385/141 |
| 2005/0153235 A1 * | 7/2005 | Levenson | 430/270.1 |
| 2005/0162804 A1 * | 7/2005 | Boronkay et al. | 361/180 |
| 2005/0181182 A1 * | 8/2005 | Heath | 428/178 |
| 2006/0146012 A1 * | 7/2006 | Arneson et al. | 345/156 |
| 2006/0222575 A1 * | 10/2006 | Chen | 422/186 |
| 2007/0040999 A1 * | 2/2007 | Wilhelmus Van Herpen et al. | 355/30 |
| 2007/0058260 A1 * | 3/2007 | Steenblik et al. | 359/626 |
| 2008/0218480 A1 * | 9/2008 | Badia I Farre | 345/168 |
| 2009/0237376 A1 * | 9/2009 | Bridger | 345/175 |

OTHER PUBLICATIONS

Kamal, H., et al, "Properties of Moiré magnifiers," *Opt. Eng.*, vol. 37, No. 11, (Nov. 1998), pp. 3007-3014.

* cited by examiner

KEYPAD WITH VIRTUAL IMAGE

RELATED APPLICATIONS

This patent claims priority to U.S. Provisional Application Ser. No. 60/804,009 filed on Jun. 6, 2006 titled KEYPAD WITH VIRTUAL IMAGE, which is incorporated by reference in its entirety herein.

TECHNICAL FIELD

The present disclosure is related to electrical keypads and touch panels, and more particularly to devices that provide indicia that appears as a virtual image above or below the apparent surface of the keypad.

BACKGROUND

Current trends for portable electronics devices, such as notebook computers, PDAs, cell phones, etc., are towards smaller, thinner, and lighter weight elements and devices. Furthermore, there is a desire to have larger area displays and often multiple active color displays within this shrinking electronics package. The data entry pad, or keypad, represents an opportunity for improved functionality in terms of thinness, weight, visual appeal, and multi-functional use of space. Several general types of keypads are briefly described below.

Thin keypads are typically molded, thermoformed, die cut or stamped from thin polymeric or metal sheet material or composite laminates of these materials. Indicia are typically printed on the surface of the keypad. In some cases, the keypads are transparent or translucent so that they may be backlit. However, while thin and lightweight, these keypads appear generally flat.

Thick keypads, also commonly referred to as "Chicklet" style key pads, are typically injection molded from flexible polymers or compression molded from polymer or metal powders. Indicia may be incorporated into the keys during the injection molding process using multiple-shot molding, formed into the surface of the key during the molding, or printed on the surface of the keys after molding. Again, transparent or translucent keypad keys may be lit from behind. However, these thick keypads are often difficult to fit into thin electronics packages.

Keyboard with touch sensing technology includes varieties that monitor the resistive contact between conducting electrodes and varieties that detect of the capacitive coupling between a user's finger and the keypad electrode. An illustrative example of the capacitance technique is embodied in the capacitive touch screen detection board made by 3M Touch Systems (e.g., 3M's touch screens that are commercially available under the name ClearTek). This detection board energizes the keypad button electrodes with an AC electrical signal. When a finger or other conducting object approaches the electrode, capacitive coupling shunts current from the electrode through the conducting object to ground. A very sensitive detection circuit on the detection board measures this current and delivers an output signal to the electronic device. One advantage of the touch sensing system is that only a single electrode is required at each keypad button location. Button switches based on electrical resistance may require two sets of electrodes for each button or alternatively a conductive layer disposed on another film located adjacent to the button electrodes.

A keyboard having a thin transparent pressure sensitive display panel is disclosed in Nakagawa U.S. Pat. No. 7,034,806 titled Virtual Keyboard. Touch sensitive detection devices such as those from 3M Touch Systems described above can provide similar functionality when mounted on an active display. The keypad on the display panel permits dynamic reallocation of key designations. However, the keypad generally appears flat. An improved keypad is desirable.

SUMMARY

The present disclosure provides keypad having a virtual image that appears to a user to be in a plane other than the apparent plane of the keypad device. More particularly, the indicia on the keypad appear to float above or below the surface of the device. The keypad can be, for example, the keypad on a cell phone. For such an application there would be more than one array of indicia present on the keypad. For example, there might be ten arrays of indicia, which provide the numerals from 0 to 9 and two more arrays to provide virtual images of the * and # keys. In some embodiments, the keypad is integrated with an illumination source that light up the indicia. The present disclosure also provides a method of manufacturing a key pad with floating indicia.

DETAILED DESCRIPTION

Some of the underlying principles for providing a naturally viewable three-dimensional image, also commonly known as a three-dimensional auto-stereoscopic image, are known. It is known that when an array of lenses is used to view an array of identical objects or indicia situated near the focal plane of the lens, a virtual image is present. It is also known that if the array of lenses have a different pitch, or repeat length, than the array of identical objects, some degree of magnification will occur, and the virtual image appears to the viewer to be in a different plane than its actual location. This phenomenon has been termed Moiré magnification. A discussion of the basic principle can be found in "The Moiré magnifier," M. C. Hutley et al, Pure Appl. Opt. 3 (1994) 133-142. Additional background may be found in "Properties of Moiré magnifiers," H. Kamal, et al, Opt. Eng. 37(11) 3007-3014 (November 1998).

In principle Moiré magnification effect is accomplished by providing a slightly shifted image of the indicia to each eye of the viewer. These shifted images are interpreted by the user as being at a location different than the physical plane on which the indicia are patterned. The use of Moiré magnifiers in security documents is discussed in WO2005/106601 to Commander et al. titled "Improved Optically Variable Devices," which is incorporated herein by reference.

Figure 1:
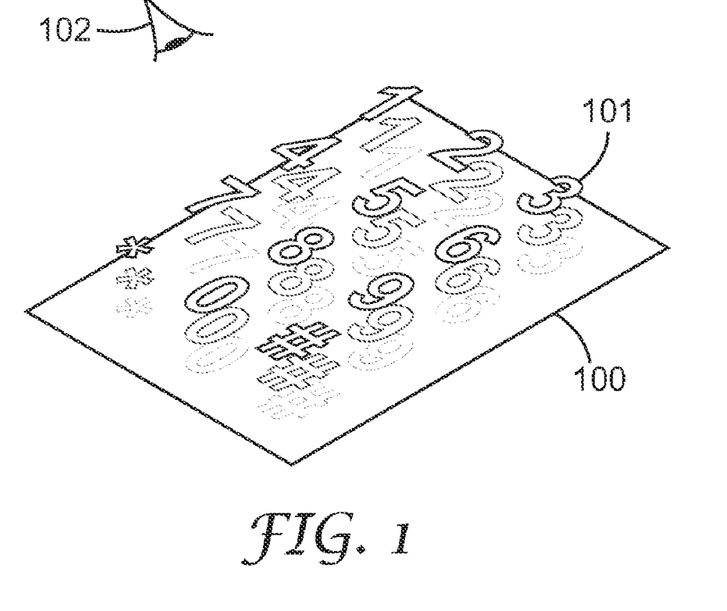
FIG. 1 shows a perspective view of an exemplary keypad film with a stylized representation of indicia in a virtual plane positioned above the real plane of the film.

Referring now to FIG. 1, an example embodiment of a virtual image keypad film 100 is shown with indicia typical of the numeric keys used to enter a phone number. The viewer 102 is shown viewing the keypad with the virtual image of the indicia appearing to float in a plane 101 above the physical plane of the keypad film 100. FIG. 1 stylizes apparent indicia in the lower plane of the keypad film 100 for the purpose of letting the reader conceptualize a degree and direction of virtual offset. In connection with the present disclosure, there is, for example, not one large numeral "1" generating the virtual image of the numeral "1" shown in the virtual image plane 101. As will be discussed with more particularity below, each numeral is generated by an array of actual images, conveniently located on the undersurface of the keypad film 100 relative to the reader. The numerals in each indicia array are too small to convey in the scale of FIG. 1.

Figure 2:
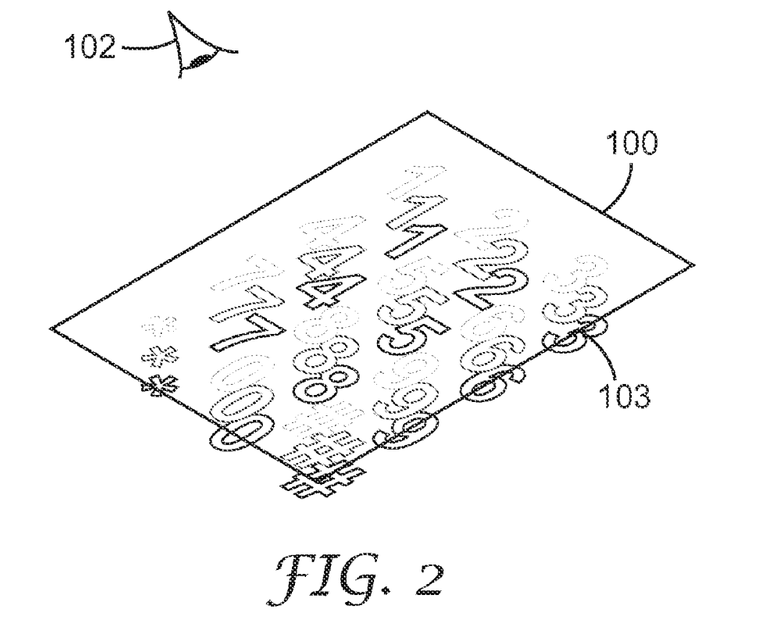
FIG. 2 shows a perspective view of an exemplary keypad film with a stylized representation of indicia in a virtual plane positioned below the real plane of the film.

Referring to FIG. 2, another example of the virtual image keypad film 100 shows the indicia sinking in a virtual image plane below 103 the physical plane of the keypad film 100. In a manner similar to FIG. 1 above, FIG. 2 stylizes apparent indicia in the lower plane of the keypad film 100 for the purpose of letting the reader conceptualize a degree and direction of virtual offset. The indicia consist of 12 individual arrays of very small numerals, as seen through the optical elements on the upper surface of keypad film 100 that generate the virtual images 103.

Figure 3:
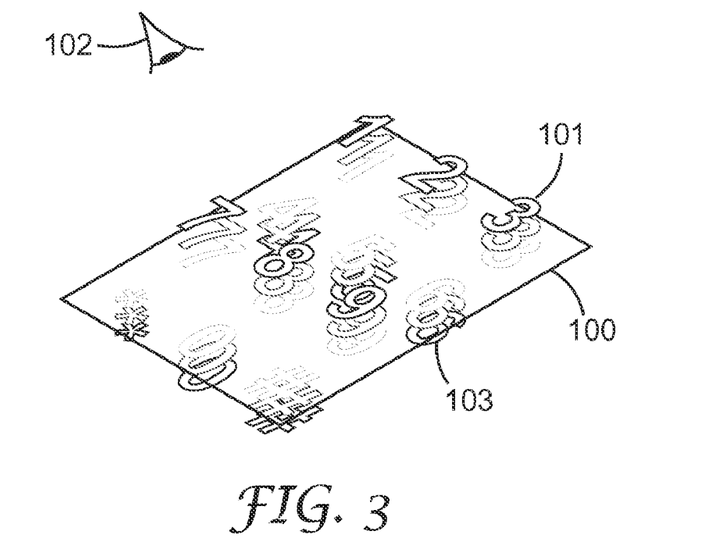
FIG. 3 shows a perspective view of an exemplary keypad film with a stylized representation of indicia in two virtual planes, one positioned above the real plane of the film, and one positioned below the real plane of the film.

In FIG. 3, both floating 101 and sinking 103 virtual images of the indicia on the virtual image keypad film 100 are visible to the viewer 102. In this Figure, the arrays that generate the two virtual image planes 101 and 103, have been left unrepresented to keep the Figure uncluttered. Though in the depicted embodiment both the floating 101 and sinking 103 virtual images are identical, it should be appreciated that they could be different as well. For example, in the context of a keyboard for a cell phone the floating images 101 could be numbers whereas the sinking images 103 could be letters that correspond with the numbers. It should also be appreciated that the images on each of the planes could be displayed in different colors or illuminated at different times.

Figure 4:
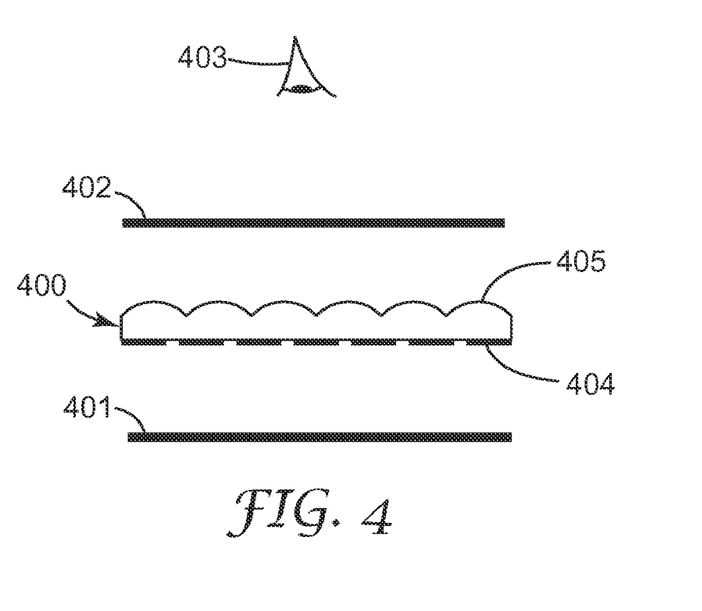
FIG. 4 shows a cross-sectional view through the film of FIG. 3.

In FIG. 4, a sectional view through the virtual image keypad film 400 is shown with optical lens elements 405 disposed on one surface of the film, and an array of indicia 404 disposed on the other surface. The viewer of this film 403 is indicated along with apparent location of highly magnified virtual images of an indicium 404 which appear to float above 402 or sink below 401 the plane of virtual image keypad film 400.

Figure 5:
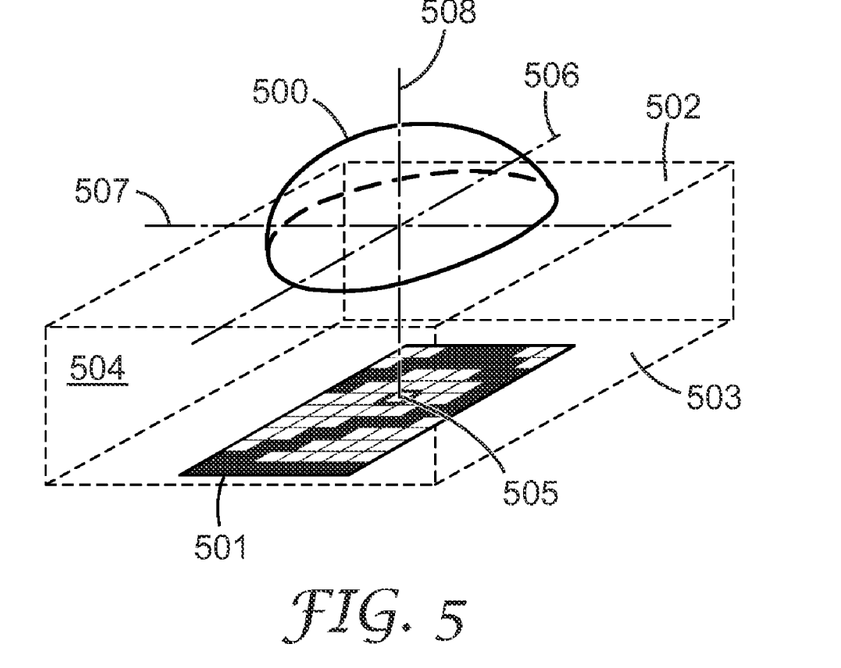
FIG. 5 shows a perspective view of a single optical element on one side of a film, positioned over an indicium on the other side of the film.

In FIG. 5, a single optical spherical or aspherical lens element 500 is shown in perspective along with an indicium 501, represented by the numeral 2. The lens element 500 is disposed on the upper surface 502 of the keypad film 504, while the indicium 501 is disposed on the lower surface 503. To generate a Moiré magnified virtual image of the numeral 2, multiple lens elements and indicia would be arranged side by side in grid arrays covering the upper and lower surfaces of the keypad film (see FIG. 7*a*). The spacing or pitch between repeated lens elements or indicia, in the array, may be as small as 10 microns or as large as 300 microns, with a pitch is between about 25 microns and 180 microns is considered particularly convenient.

In FIG. 5, the indicium 501 is stylized as being constructed from small pixilated elements 505. This stylization is meant to aid the reader in conceptualizing the principle of Moiré magnification, and in practice the indicium 501 would be formed in a smooth continuous fashion, using a process such as casting or printing. Orthogonal lines 506, 507 and 508, through the symmetry axes of the lens element 500, indicate the alignment, or registration, of the lens element over a particular location 505 of the indicium 501. To achieve a sharp magnified image of the indicia, the focal plane of the spherical or aspherical lens element 500 in the depicted embodiment is located substantially in the plane of the indicia. However, this is not essential. It should be appreciated that this focusing requirement demands careful control over the thickness of the keypad film 504.

Figure 6:
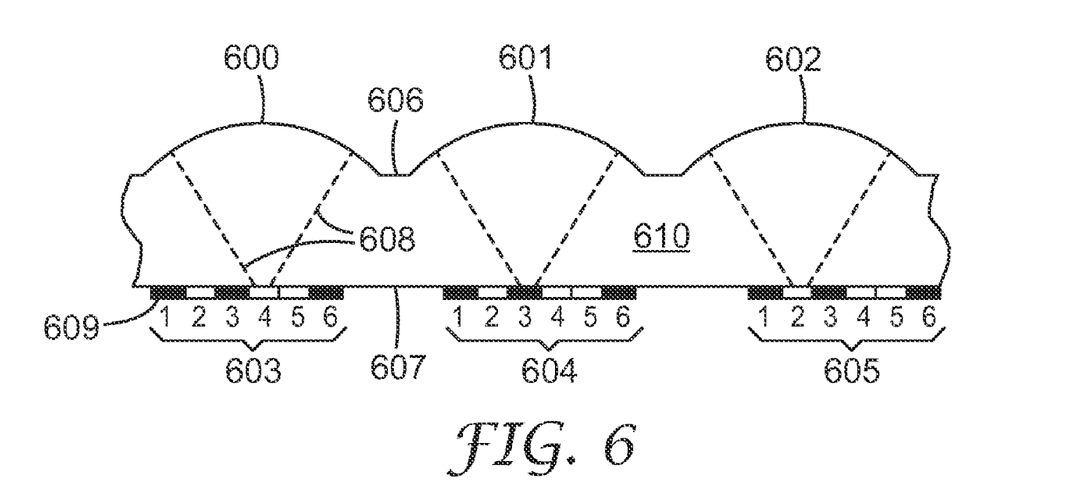
FIG. 6 shows a cross-sectional view of three lens elements within an array positioned above three indicia elements within an associated array.

In FIG. 6, a section view of lens elements 600, 601 and 602 is shown above indicia 603, 604, and 605 in a virtual image keypad film 610. The indica 603, 604, and 605 could, for example, be the same as the indicium 501 (e.g., image of the numeral 2) in FIG. 5. Moreover, lens elements 600, 601, 602 can be the same as the lenses element 500 of FIG. 5. The lens elements in FIG. 6 are disposed in an array on the top surface 606 of the film 610 and indicia in an array on the bottom surface 607. As in FIG. 5, indicium are stylized as small pixel elements 609 where in practice the indicia would be made in smooth continuous fashion. The pixel elements 609 in FIG. 6 are enumerated 1,2,3 . . . 6 to help the reader better discern the alignment between lens elements and indicia. Dashed lines 608 are drawn to indicate the center of focus for each lens element 600, 601 and 602. As can be observed in FIG. 6, lens element 600 is centered above pixel 4 of indicium 603, lens element 601 above pixel 3 of indicium 604 and lens element 602 above pixel 2 of indicium 605. This small but progressive pitch mismatch between the arrays of lens elements and indicia produces the effect of Moiré magnification. Computational details of the amount of magnification that can be achieved for a given pitch mismatch are given in the aforementioned reference papers. Other factors such as the optical index of refraction of the keypad film 610 will also affect the amount of Moiré magnification achieved.

If the spacing or pitch of the lens element array is slightly smaller than the pitch of the indicia array, as drawn in FIG. 6, a magnified virtual image will appear to float above the plane of the keypad film 610. If the pitch of the lens elements is slightly larger than that of the indicia, the magnified virtual image will appear to sink below the keypad film.

It can be appreciated that careful alignment or registration between the array of lens elements 600, 601 and 602 and indicia 603, 604, 605 is used to achieve a desired virtual image. In practical terms, the registration error of a lens element should deviate from an ideal position by no more than about 10 percent of the array pitch spacing being used, though this is not essential. Likewise, careful control of the shape of the lens element and the overall thickness of the keypad film 610 is required to produce sharply focused virtual images, though this is not essential.

Figure 7A:
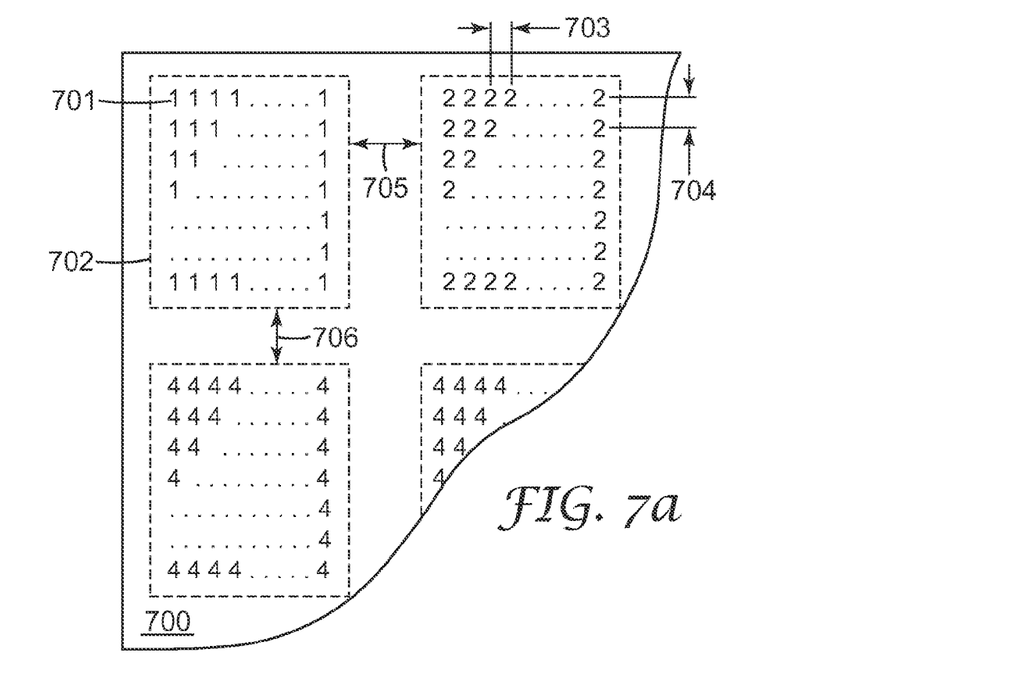
FIG. 7a shows a stylization of multiple indicia arrays for a portion of a virtual image keypad film.

In FIG. 7a, a stylization of indicia arrays 702 for a portion of a virtual image keypad film 700 is shown. These indicia arrays would be disposed on the bottom surface 503 of the keypad film 504 shown in FIG. 5. Though in the depicted embodiment the indicia extend from the bottom surface 503 of the keypad film, it should be appreciated that in alternative embodiments the indicia could be recessed within the bottom surface 503 of the keypad film. Recessed indicia are particularly amendable to be coated with a coloring agent, which can result in the indicia having a colored appearance.

As discussed above, the indicia 701 are shown in an enlarged scale, relative to the keypad, so as to convey the idea of the Moiré magnification method while keeping the Figure uncluttered. Furthermore, only a representative number of indicia are shown with continuation dots representing the remainder of the array. A plurality of indicia is arranged in block arrays 702 responding to each keypad symbol. Spacing 705 and 706 between these block arrays helps to prevent visual interference between the virtual image of one keypad position and its neighbors. Spacing 703 and 704 between indicium within a block array 702 affects the degree of Moiré magnification achieved, as was previously described in FIGS. 5 and 6. In a typical embodiment, the spacing 703 and 704 along the two orthogonal array axes would be the same, but different spacing could be accommodated by adjusting the spacing 712 and 713 of the lens elements 710 in FIG. 7b. It may be desirable to vary the indicia spacing 703 and 704 for different block arrays 702 to allow some virtual images to float above or sink below the plane of the keypad film 700.

Figure 7B:
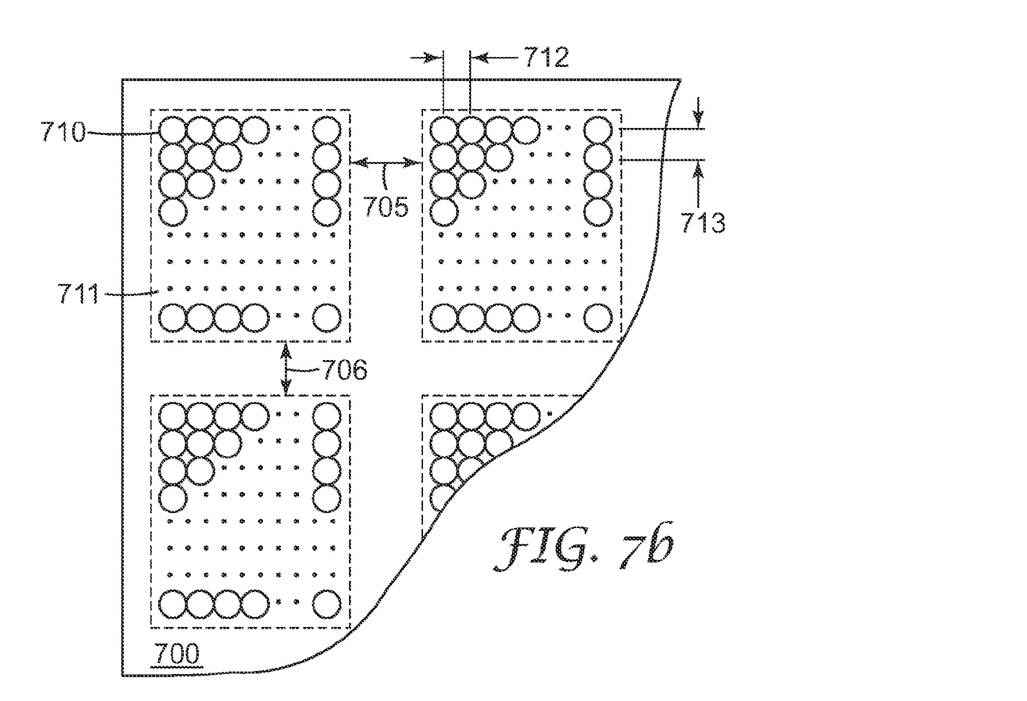
FIG. 7b shows a stylization of lens element arrays for a portion of a virtual image keypad film.

In FIG. 7b, a stylization of lens element arrays 711 for a portion of a virtual image keypad film 700 is shown. These lens element arrays would be disposed on the top surface 502 of the keypad film 504 shown in FIG. 5. Similar to the indicia 701 in FIG. 7a, the lens elements 710 are shown in an enlarged scale, relative to the keypad, to keep the Figure uncluttered. Only a representative number of lens elements are shown with continuation dots representing the remainder of the array. In FIG. 7b, indicia are arranged in block arrays 711 for each keypad symbol and located under each keypad position. Spacing 705 and 706 between these block arrays helps to prevent visual interference between neighboring virtual images. It should be appreciated that in some embodiment there is no spacing between the arrays of lenses or indicia. In other embodiments there is spacing between the arrays of indicia, but no spacing between the arrays of lenses. In yet other embodiments there is spacing between the arrays of lenses, but no spacing between the arrays of indicia. Spacing 712 and 713 between lens elements, in conjunction with the spacing 703 and 704 between indicia in FIG. 7a, largely determines the degree of Moiré magnification of the indicia in FIG. 7a. Spacing of lens elements, relative to indicia spacing, also determines whether the virtual image will appear to float above or below the keypad film 700. It may be desirable to vary the lens element spacing between block arrays 711 so that some virtual images float while others sink.

Figure 7C:
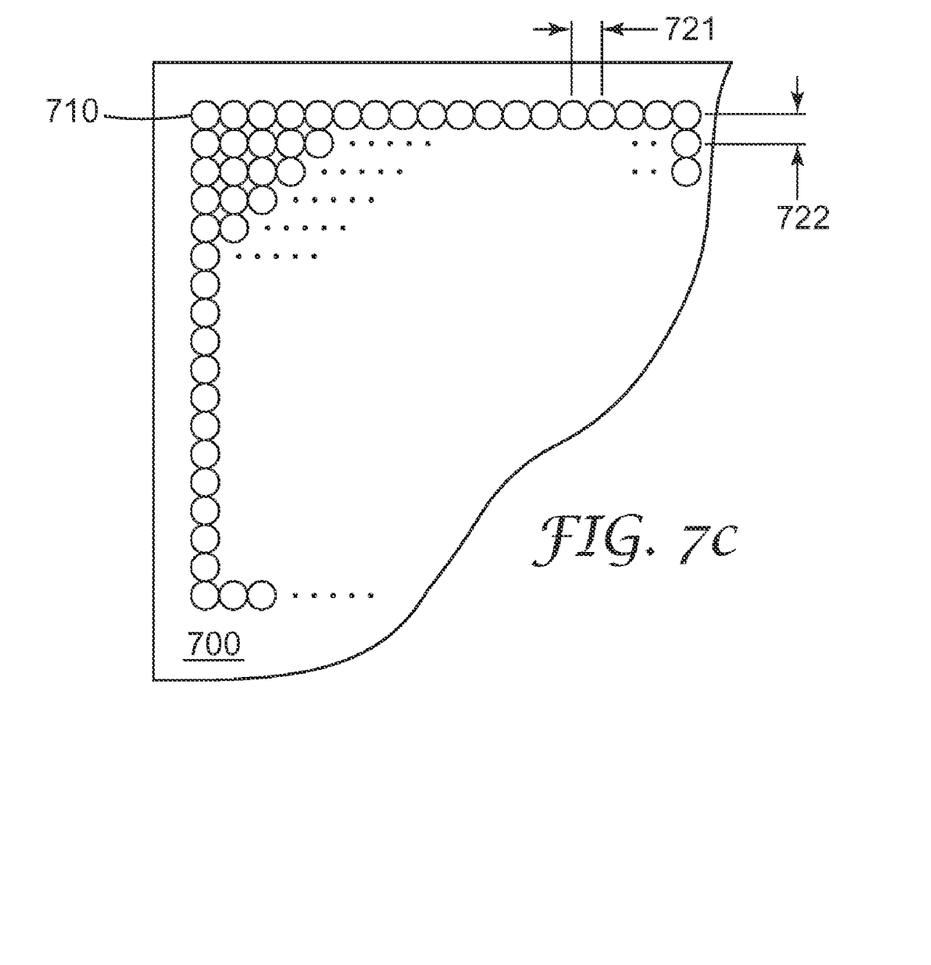
FIG. 7c shows lens array elements in a continuous array of lens elements covering the entire surface of a virtual image keypad film.

It is not necessary to dispose the lens array elements in separate block arrays 711 as shown in FIG. 7b. In FIG. 7c, a continuous array of lens elements 710 is shown covering the entire surface of the virtual image keypad film 700. Spacing 721 and 722 between the two orthogonal axes of the lens element array, along with the spacing 703 and 704 of indicia shown in FIG. 7a, is a determining factor in the degree of Moiré magnification achieved and whether the virtual images formed will appear to float or sink below the surface of the keypad film 700.

Figure 8:
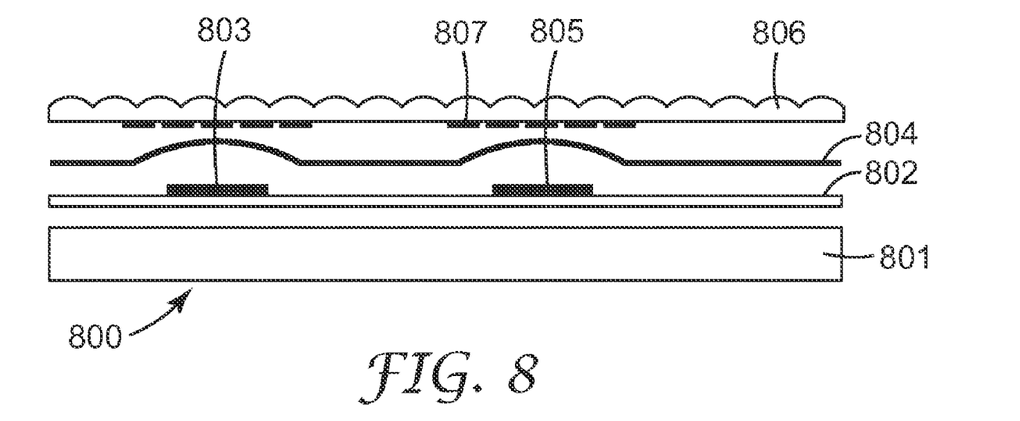
FIG. 8 shows a cross-sectional view of an exemplary virtual image keypad assembly.

In FIG. 8, a section view of a virtual image keypad assembly 800 is shown. At the bottom of the assembly is a substrate 801 which provides mechanical and/or structural support for the layers above. It may also be desirable for the substrate 801 to provide other functionality such as backlighting of the keypad or display of programmable soft keys. A flexible printed circuit (FPC) 802 is disposed above the substrate 801 and provides electrode pads 803 for each of the keypad buttons. Alternatively, electrode pads may be deposited directly on the substrate 801 and the FPC 802 omitted. Optically transparent electrode pads may be used if light transmission through the keypad assembly is desired. Above the FPC is a domed film 804 to provide tactile feedback for the user. Processes such as thermoforming or stamping may be used to create domes 805 in suitable polymeric or metal sheet materials. The domed film 804 may be optionally omitted if no tactile feel is required. The virtual image keypad film 806 is disposed above the domed film 804, with arrays of indicia 807 located at each keypad button location. An optional transparent cover film or coating, not shown in FIG. 8, may be placed over the virtual image film 806 to provide protection from physical damage or a top surface that is easy to clean. In an alternative embodiment, the flexible printed circuit board can be of the type that is activated without physical contact. For example the circuit can be configured to detect the presence of a user's finger. Such circuits are commercially available from various sources such as Quantum Research Group at http://www.qprox.com/.

Figure 9:
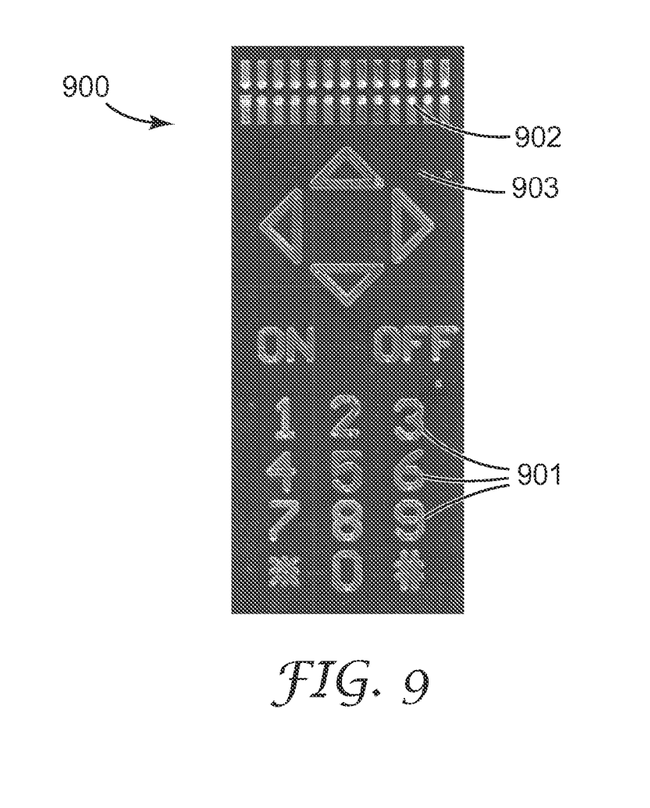
FIG. 9 shows a circuit board for the capacitive touch keypad assembly of FIG. 8.

In FIG. 9, a circuit board 900 is shown for a capacitive touch embodiment of the keypad assembly 800 of FIG. 8. Electrodes 901 are shown for each of the keypad button locations. Conductive electrical circuits connect these electrodes to a set of connector pads 802 that communicate with a capacitive touch screen detection board manufactured by 3M Touch Systems. These electrical circuits are not visible in FIG. 9 because they are obscured by a black dielectric coating 903 that covers the surface of the circuit board 900.

Figure 10:
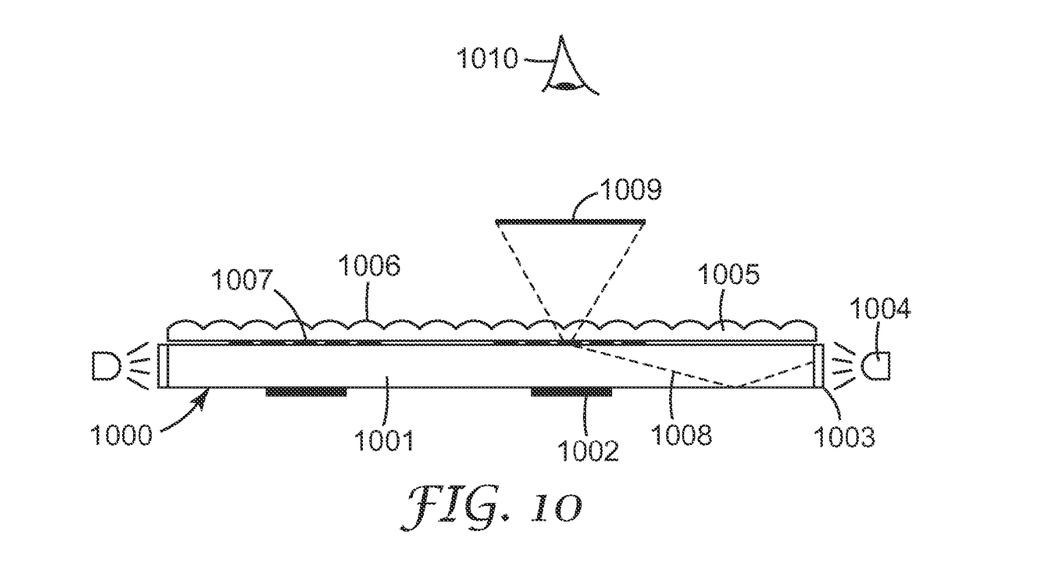
FIG. 10 shows an exemplary backlit touch sensitive virtual image keypad assembly.

In FIG. 10, an exemplary backlit touch sensitive virtual image keypad assembly 1000 is illustrated. The assembly has a thin film light waveguide device 1001 with electrodes 1002 to provide touch sensing capability similar to those in FIG. 8. Optionally, optical structures 1003 may be included to enhance the injection of light into the waveguide film from lamps 1004. Light emitting diodes (LEDs) may be used as a convenient light source. Thin film light waveguides may be fabricated by methods such as injection molding, stamping, thermoforming, printing or cast replication. A virtual image keypad film 1005 is disposed on top of the light waveguide 1001. Similar to FIGS. 4 through 7, an array of optical lens elements 1006 are carefully aligned over arrays of indicia 1007 so that virtual floating or sinking images are formed through the principle of Moiré magnification. In FIG. 10, the arrays of indicia serve the additional purpose of extracting light from the thin film light waveguide device 1001. Moreover, in some embodiments the indicia are the only light extraction features in the waveguide. A coupling agent such as an optical grade adhesive or coating may be used to enhance the extraction of light from the waveguide.

While there are many methods of constructing the keypad, it may be appreciated that it is convenient to use the precise registration capabilities of a two-sided continuous cast and cure process (2S3C) to create the lens and indicia arrays. To summarize such a process shortly, the layer of transparent material is formed from polymer by casting from monomeric or oligomeric precursor, and the indicia and optical elements are formed during the casting. One suitable process of this type is described in copending and coassigned U.S. patent application number US 20050051931, "Apparatus and method for producing two-sided patterned webs in registration," to Humlicek et al. This document is hereby incorporated by reference as if rewritten. The referenced process is capable of providing transparent films that have very small features, such as optical lens elements and indicia, on each of the major faces of an optically transparent thin film material. Further, these features are in a high degree of registration between the two major surfaces, ideal in connection with the present disclosure. However, the formation of the either the indicia or optical elements can alternatively be accomplished by embossing, injection molding. Removal processes such as ablation or etching may also be used. The indicia can further to applied by printing. This method does not require a precise alignment between the virtual image keypad film 1005 and the light waveguide 1001. In FIG. 10, the arrays of indicia serve the additional purpose of extracting light from the thin film light waveguide device 1001. A coupling agent such as an optical grade adhesive or coating may be used to enhance the extraction of light from the waveguide.

In the depicted embodiment, the lighted indicia will appear to a viewer 1010 as a highly magnified image 1009 of an indicium floating above the plane of the keypad assembly 1000. A stylized representation of a light ray 1008 trace through the thin film light waveguide 1001 is shown. It may be appreciated that depending on the spacing for the lens array and indicia the lighted virtual image 1009 may also appear to sink below the plane of the keypad assembly 1000.

In an alternative embodiment, the film that supports the lenses and the indicia can also act as a light waveguide. In such an embodiment, the lamps 1004 direct light through the edges of the keypad film 1005 (610 of FIG. 6) eliminating the need for a separate wave guide 1001. Whether the indicia 1007 extend from the bottom surface of the film 1005 as illustrated or are recessed into the bottom surface of the film as described above, the indicia can in some embodiments operate to enhance the extraction of light from the waveguide.

Figure 11:
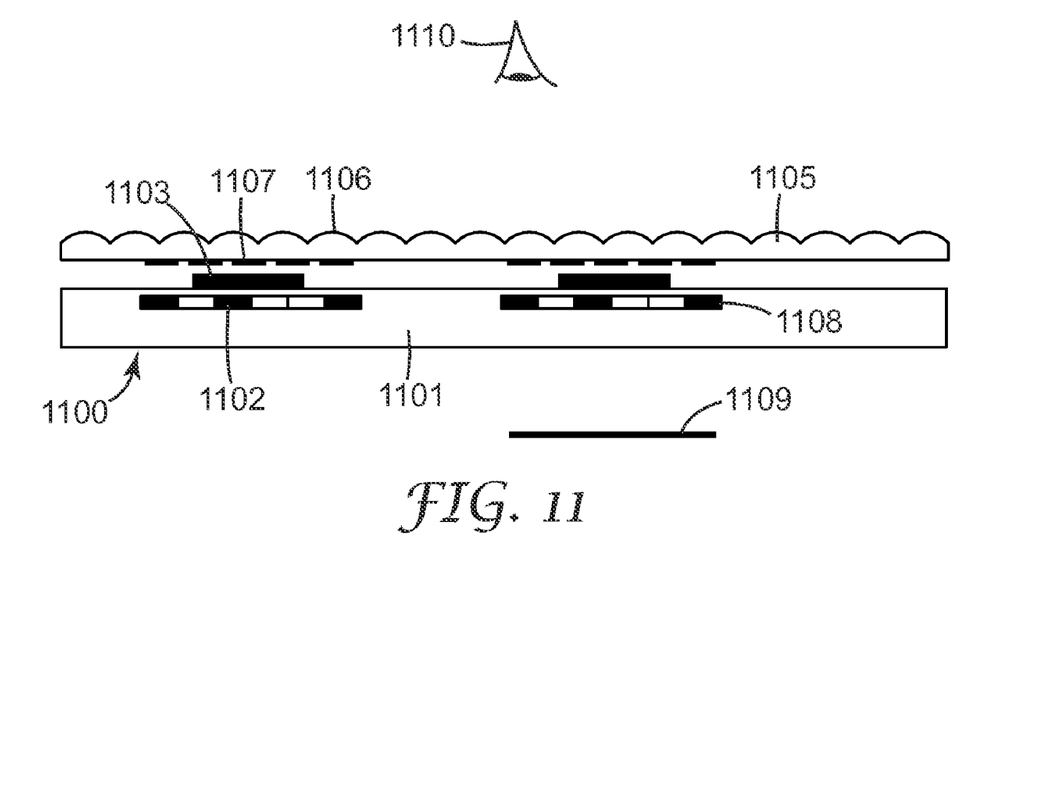
FIG. 11 shows an exemplary dynamically programmable touch sensitive keypad assembly with virtual image elements.

In FIG. 11, an exemplary dynamically programmable touch sensitive keypad assembly 1100 with virtual image elements is shown. An active display device 1101 is shown with pixilated display elements 1102 whose content may be dynamically programmed under the control of an electronic device such as, but not limited to, a cell phone or computer. Liquid crystal display (LCD) or organic light emitting diode (OLED) display systems are some of the suitable choices for the keypad assembly 1100. Optically transparent electrodes 1103 are shown on the surface of the active display device 1101 to provide touch sensing functionality. A virtual image keypad film 1105 is disposed on top of the active display device 1101. Arrays of micro lens elements 1106 and indicia 1107 create highly magnified virtual images 1109 of an indicium that appears to a viewer 1110 as sinking below the keypad assembly 1100. Images from the active display device 1101 will appear as dynamically programmable keycaps disposed on top of the sunken virtual keypad buttons. This dynamic "softkey" functionality would permit more efficient use of valuable keypad area as well as better visual feedback to the user. The virtual button elements provide enhanced visual cues that guide the user towards touch sensitive target locations on the display.

Figure 12:
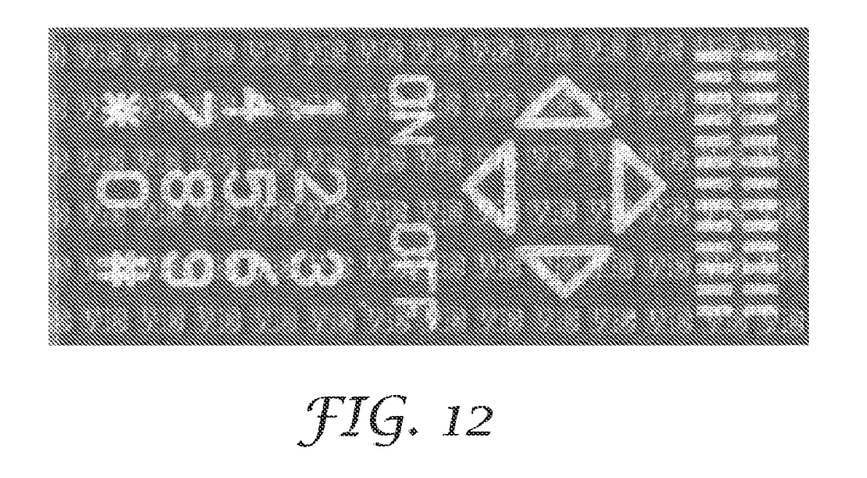
FIG. 12 shows a photograph of an exemplary embodiment of a virtual image keypad film.

In FIG. 12, photo of a virtual image keypad film according to the present disclosure is shown. The indicia and lens elements were created sequentially in two thin layers of ultraviolet (UV) curable acrylate resin cast onto both faces of a substrate film. This substrate film was a 50 micron thick film of optical grade bi-axially oriented polyethylene terephthalate (PET). As discussed above, the keypad according to some embodiments of the disclosure can be manufactured using a continuous roll based manufacturing process, which is a typically relatively fast manufacturing process.

These virtual images were created by the interaction of a single large array of indicia on the lower surface of the substrate material with a corresponding array of optical lens elements on the upper surface. A sample numeric keypad patterned on a clear plastic substrate was superimposed on the virtual image. Highly magnified virtual images of the indicia appear to sink below the surface of the numeric keypad.

The height and width of each individual indicium in the array was 75 microns and 125 microns, respectively. Center-to-center spacing (i.e., pitch) between indicium within the indicia array was 156.25 microns in both orthogonal directions. The optical lens elements were cast with dimensions of 120 microns in diameter with a radius of curvature of 62.6 microns and a conic constant of 0.441. The spacing between optical lens elements within the array was 160.0 microns in both orthogonal directions. In alternative embodiments where the lenses pitch is 160 microns and the center-to-center spacing between the indicium was 156 microns or 158 microns the resulting image appears to sink below the surface of the keypad plane. In yet other alternative embodiments where the lenses pitch is 160 microns and the center-to-center spacing between the indicium was 162 microns or 164 microns the resulting in the image appears to rise above the surface of the keypad plane. While the invention of the present disclosure is operable with a wide range of pitches for the optical elements and the indicia, in certain exemplary embodiments a pitch is between about 10 microns and 300 microns is preferred, and in other exemplary embodiments, a pitch between about 25 microns and 180 microns is considered particularly preferred.

The invention of the present disclosure is operable with a wide variety of different types of lenses, and may operate with any of transmitted, reflected, or transflected light. However, converging lenses are considered particularly suitable. In some exemplary embodiments, the touch actuated electrical contact according to the present disclosure may optionally include a contrast enhancing layer adjacent to the second side for increasing the contrast of the indicia. This contrast enhancing layer may be conveniently formed by, for example, vapor deposition, printing, laminating, embossing or coating.

While the invention has been particularly shown and described with reference to various embodiments thereof, it will be understood by those skilled in the art that various other changes in the form and details may be made therein without departing from the spirit and scope of the invention.

What is claimed is:

1. A keypad, comprising:
   a film having a first primary surface opposite a second primary surface;
   a first and a second array of indicia spaced apart on the first primary surface;
   an array of lenses on the second primary surface,
   wherein the first and second arrays of indicia and the array of lenses are configured such that they cooperate to generate a first virtual image and second virtual image wherein the virtual images are different and both appear to be in a plane outside of the film;
   a flexible printed circuit positioned adjacent the first primary surface of the film, wherein the flexible printed circuit includes a first touch sensitive electrode pad positioned adjacent the first array of indicia and a second touch sensitive electrode pad positioned adjacent the second array of indicia.

2. The keypad of claim 1, further comprising electrical components configured to detect the presence of a user's finger in the proximity of the first array of indicia.

3. The keypad of claim 1, further comprising electrical components arranged to detect contact between a user's finger and the film in the proximity of the first array of indicia.

4. The keypad of claim 1, wherein the first and second virtual images are in the same plane.

5. The keypad of claim 1, wherein the first virtual image is in a plane above the film and the second virtual image is in a plane below the film.

6. The keypad of claim 1, wherein at least one of the virtual images is a number or letter.

7. The keypad of claim 1, further comprising a light source configured to illuminate the virtual images.

8. The keypad of claim 7, further comprising a waveguide positioned adjacent to the first primary surface of the film, wherein the waveguide is configured to receive and transmit light emitted from the light source.

9. The keypad of claim 7, wherein the light source is configured to direct light into a periphery edge of the film.

10. The keypad of claim 7, wherein the indicia are coated with an optical grade adhesive.

11. The key pad of claim 1, wherein the film includes a plurality of arrays of lenses space apart on the second primary surface of the film.

12. The keypad of claim 1, further comprising a dome film positioned between the flexible printed circuit board and the first primary surface of the film.

13. The keypad of claim 1, wherein the array of lenses includes a plurality of single optical spherical lens elements.

14. A user actuated switch, comprising:
a layer of transparent material having a first side and a second side, wherein the first side includes an array of optical elements having a first pitch and the second side includes an array of indicia having a second pitch such that the layer of transparent material creates a virtual image in a plane outside of the layer of transparent material; and
an electrical switch mounted adjacent the layer of transparent material;
an illumination source positioned to illuminate an edge of the layer of transparent material,
wherein the indicia act as light extraction features that direct light from the illumination source out of the layer of transparent material.

15. The switch of claim 14, wherein a plurality of different arrays of indicia corresponding to a plurality of electrical switches cooperatively provide a data entry keypad.

16. The switch of claim 14, wherein the optical elements are converging lenses.

17. The switch of claim 14, wherein the first pitch is between about 10 microns to 300 microns.

18. The switch of claim 14, wherein the layer of transparent material has light extraction features that direct light from the illumination source out of the layer of transparent material.

19. The switch of claim 14, wherein the layer of transparent material comprises at least one polymeric layer adhered to a layer of glass.

20. The switch of claim 14, further comprising a contrast enhancing layer adjacent to the second side, wherein the contrast enhancing layer is formed by a process selected from the group consisting of vapor deposition, printing, laminating, embossing and coating.

21. The switch of claim 14, wherein the electrical switch is resistive.

22. The switch of claim 14, wherein the electrical switch is capacitive.

23. A method of manufacturing a user actuated switch, comprising:
providing a layer of transparent material having a first side and a second side, wherein the first side includes an array of optical elements having a first pitch and the second side includes an array of indicia having a second pitch such that the layer of transparent material creates a virtual image in a plane outside of the layer of transparent material; and
providing an electrical switch mounted adjacent the layer of transparent material; and
providing a flexible printed circuit positioned adjacent the first primary surface of the film, wherein the flexible printed circuit includes a first touch sensitive electrode pad positioned adjacent the first array of indicia and a second touch sensitive electrode pad positioned adjacent the second array of indicia.

24. The method of claim 23, wherein the layer of transparent material is formed from polymer by casting from a monomeric or oligomeric precursor, and wherein the indicia and optical elements are formed during the casting.

25. The method of claim 23, wherein at least one of the indicia or optical elements is formed by embossing.

26. The method of claim 23, wherein at least one of the indicia or optical elements is formed by injection molding.

27. The method of claim 23, wherein at least one of the indicia or optical elements is formed by a removal process.

28. The method of claim 23, wherein indicia are formed by a method selected from the group consisting of printing, casting, etching, ablation, and molding.

* * * * *